McROY DE VIESE.
PLOW.
APPLICATION FILED SEPT. 14, 1911.

1,050,923.

Patented Jan. 21, 1913.

2 SHEETS—SHEET 1.

Witnesses

M<sup>c</sup>R. De Viese  Inventor by C.A.Snow & Co.
Attorneys

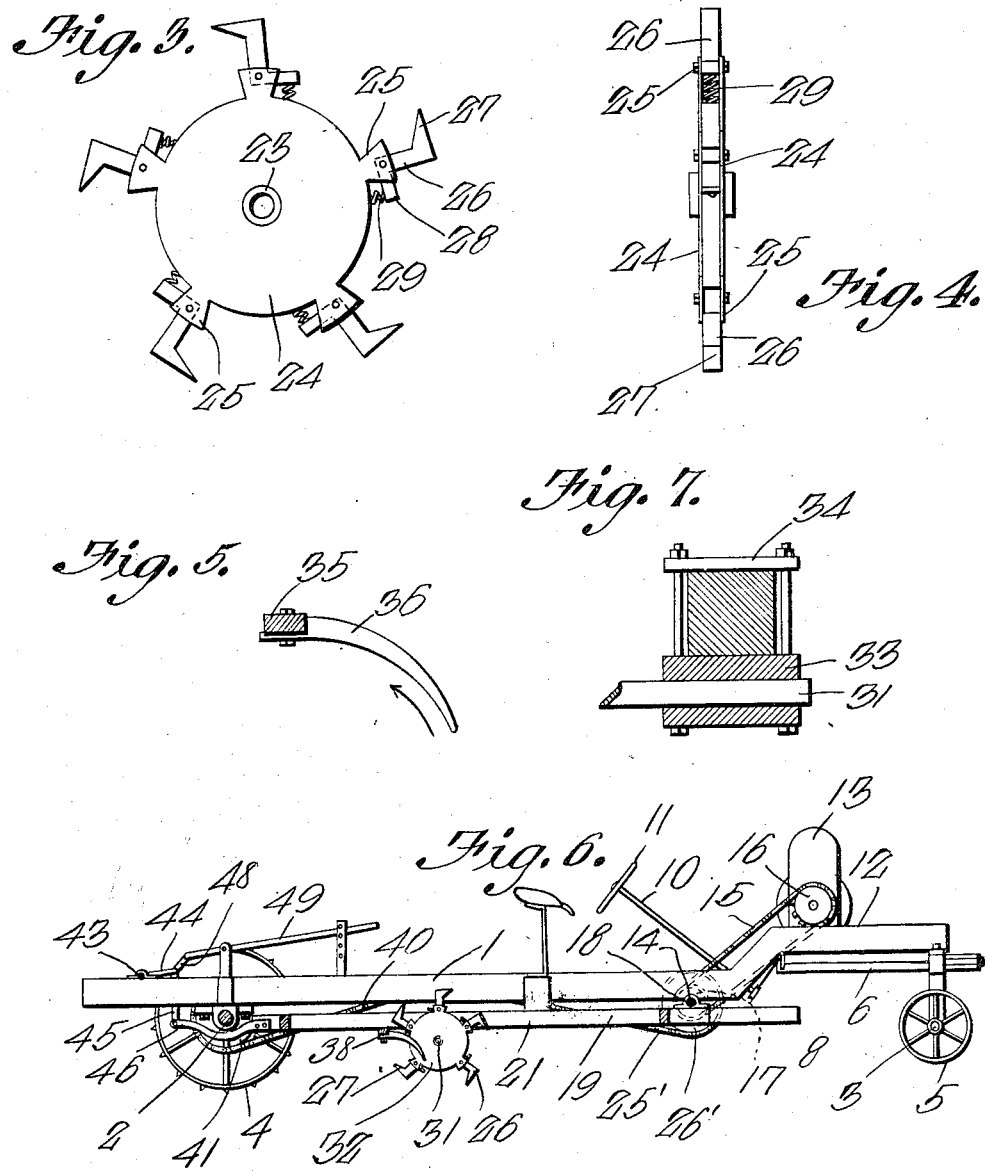

UNITED STATES PATENT OFFICE.

McROY DE VIESE, OF FRESNO, CALIFORNIA.

PLOW.

1,050,923. Specification of Letters Patent. Patented Jan. 21, 1913.

Application filed September 14, 1911. Serial No. 649,301.

*To all whom it may concern:*

Be it known that I, McROY DE VIESE, a citizen of the United States, residing at Fresno, in the county of Fresno and State of California, have invented a new and useful Plow, of which the following is a specification.

This invention relates to rotary plows and more particularly to machines of this type adapted to be propelled by motors, one of the objects of the invention being to provide a gang of rotary plows, said gang consisting of movably connected sections adapted to be adjusted angularly relative to each other.

A further object is to provide a plow of this type including a supplemental frame carrying the soil engaging devices, said frame being shiftable upwardly and downwardly to produce a corresponding movement of the gang of plows.

Another object is to provide rotary plows each of which includes a series of movably mounted soil engaging devices having means for holding them yieldingly in operative positions whereby, should the devices move against an unyielding object, they would be free to yield and pass thereover, thus preventing injury to any part of the machine.

Another object is to provide means for cleaning the plows during the operation thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

Figure 1:
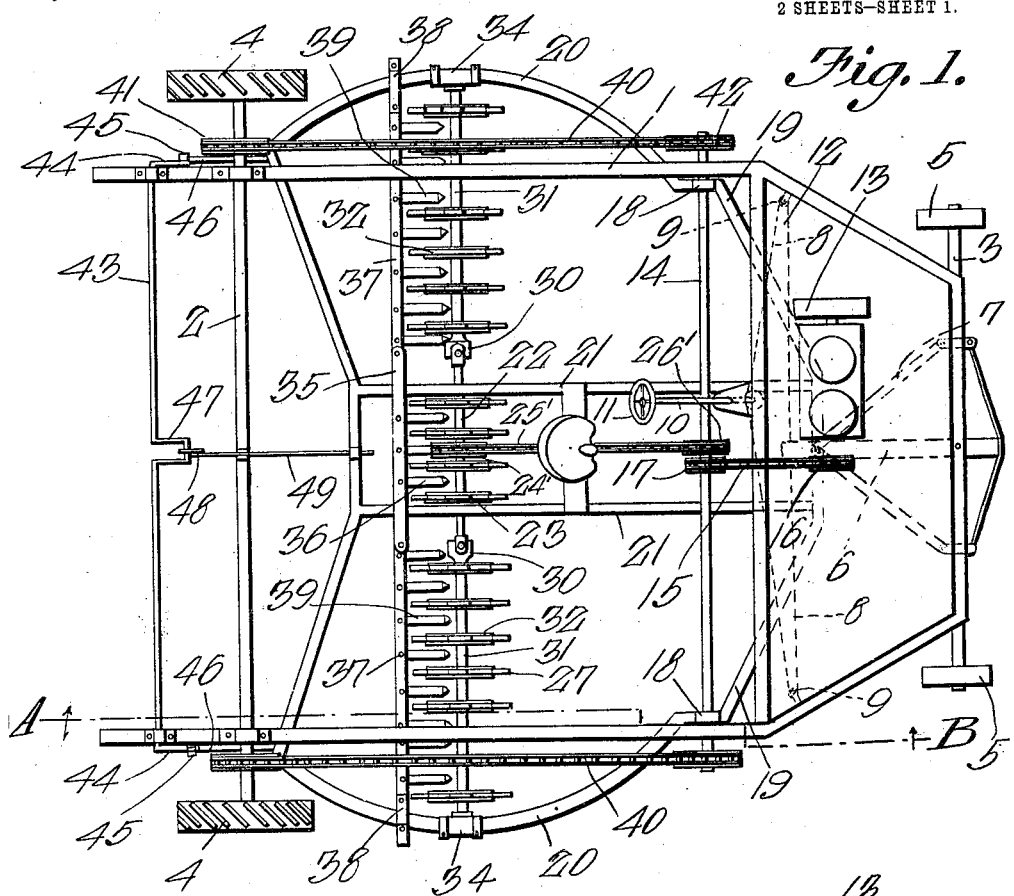
Figure 2:
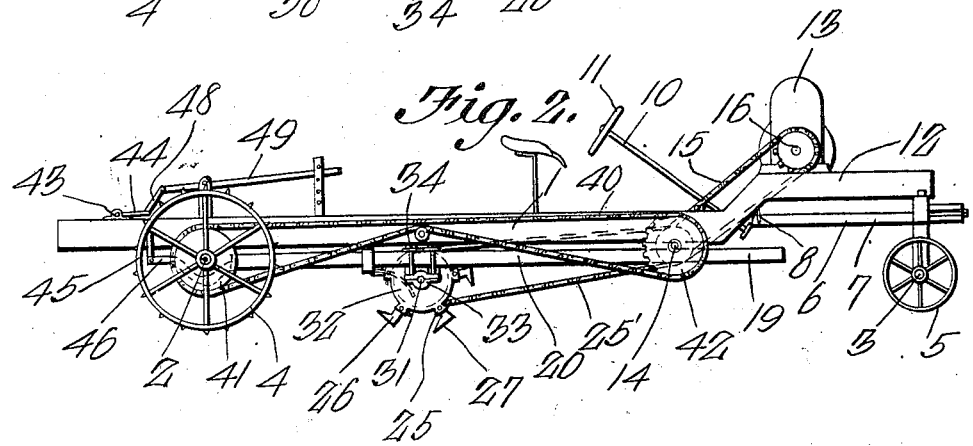

In said drawings:—Figure 1 is a plan view of the machine. Fig. 2 is a side elevation thereof. Fig. 3 is an enlarged side elevation of one of the plows. Fig. 4 is a front elevation of the plow shown in Fig. 3. Fig. 5 is an enlarged section through one of the plow cleaners, a tooth being shown in elevation. Fig. 6 is a section on line A—B Fig. 1. Fig. 7 is an enlarged section through one of the end bearings of the shaft of the gang of plows.

Referring to the figures by characters of reference 1 designates the main frame of the machine, the same being supported by a rear axle 2 and a front or steering axle 3, the rear axle being supported by wheels 4 and adapted to be rotated thereby while the front axle, which is supported by wheels 5 has a tongue 6 extending rearwardly therefrom at its center and suitably braced, as at 7. Steering cables or chains 8 extend from the rear end of tongue 6 to guide sheaves or sprockets 9 located adjacent the sides of the frame 1, these flexible connections being then extended inwardly to a shaft 10 to which they are secured and about which they are adapted to be wound. A steering wheel 11 is secured on the shaft 10 whereby the same can be conveniently rotated for the purpose of shifting the flexible connections 8 and swinging tongue 6 toward either side of the frame. In this manner the machine can be guided while being propelled. A platform 12 is mounted on the frame 1 and a motor, such as indicated generally at 13 may be mounted on this platform.

A shaft 14 is journaled on and extends transversely of the frame 1 and receives motion, through a chain 15 and sprockets 16 and 17, from the motor 13. This shaft 14 is engaged by bearings 18 secured on the front portion of a supplemental frame 19 located under the main frame 1. It will thus be apparent that the said supplemental frame can swing relative to the main frame and with shaft 14 as its axis, without, however, interfering with the rotation of said shaft. The sides of the frame are preferably bowed, as indicated at 20, and longitudinal beams 21 are arranged adjacent the center of the frame 19 and have a shaft section 22 journaled thereon. This shaft section is provided with a series of rotary plows such as indicated generally at 23, and a sprocket 24' is preferably secured to said shaft and receives motion, as through a chain 25', from a sprocket 26' secured to the shaft 14. Each of the plows 23 consists of a disk 24 having ears 25 extending from its periphery and arranged in pairs, the ears of each pair being spaced apart laterally so as to receive between them the shank 26 of the plow point 27. An arm 28 extends from the shank 26 and a spring 29 is interposed between this arm and the periphery of disk 24, thus serving to hold the shank yieldingly in a predetermined position during the operation of the plow.

Any desired number of plows 23 may be secured to the shaft section 22 and the ends of this shaft section are connected, by universal joints 30, to shaft sections 31 each of which is likewise provided with rotary plows 32 similar in all respects to the plows 23 hereinbefore described. The outer ends of these shaft sections 31 are journaled in bearings 33 supported by clips 34 which are slidably mounted on the curved portions 20 of the frame 19 and are adapted to be tightened so as to hold the bearings against movement. The curved portions 20 are concentric with the universal joints 30 so that the shaft sections 31 can be swung about said joints as pivots and their outer ends can be held in any positions to which they may be adjusted, by tightening the clips 34. This adjustment of the shaft sections 31 will not, however, interfere with their rotation as shaft section 22, when rotated, will always transmit motion to the shaft sections 31 through the universal joints 30.

A bar 35 is secured upon the beams 21 back of the shaft section 22 and is of the same length as said section. This bar has curved teeth 36 extending forwardly and downwardly therefrom and projecting between the plows 23 on shaft section 22. Additional bars 37 are pivotally connected to the ends of the bars 35 and extend under the curved portions 20 of frame 19, the outer end portions of these bars 37 being connected to said curved portions 20 by clips 38 of any desired form. These bars 37 are likewise formed with forwardly and downwardly curved fingers 39 similar to the fingers 36 hereinbefore described. Said fingers 39 project between the plows 32 on the shaft sections 31. By providing these fingers it will be apparent that, as the plows rotate, any trash carried upwardly thereby will engage the lower concave faces of the teeth 36 and will be deflected outwardly and rearwardly as indicated by the arrow in Fig. 5, thus being disengaged from the plows and deposited on the ground. Clogging of the plows is thus prevented.

Motion is transmitted from shaft 14 to the rear axle 2 by a chain 40 mounted on a sprocket 41 secured to the rear axle 2 and on a sprocket 42 secured to the shaft 14. Two of these chains may be provided, one being located at each side of the frame 1 and each chain being provided with sprockets 41 and 42.

A lifting shaft 43 is journaled upon the rear portion of frame 1 and has crank arms 44 at its ends connected, by links 45, to arms 46 extending rearwardly from the frame 19. A crank 47 is carried by shaft 43 at a point between its ends and is connected, by a link 48 to an operating lever 49.

Before starting the machine forward, the shaft sections 31 and the bars 37 are adjusted relative to the shaft section 22 and bar 35 so as to extend at any desired angles relative thereto. Lever 49 is shifted so as to rotate shaft 43 and lower frame 19 thus to bring the soil engaging devices 27 onto the ground. The machine is then propelled forward motion being transmitted from the motor through chains 15 and 25 to the shafts 14 and 22 and, through chain 40 to the rear axle 2. As the shaft section 22 and the sections 33 rotate the plow points 27 will be brought successively into the ground and will turn the soil. Should the points come into contact with unyielding objects the springs 29 will permit said points to swing back and thus pass over said objects without causing injury to the plow.

What is claimed is:—

1. A rotary plow including a motor propelled structure, a shaft having normally alining central and end sections, said end sections being mounted for angular adjustment, means for rotating the shaft, and revoluble soil engaging devices carried by each section of the shaft.

2. A machine of the class described including a movably supported structure, a revoluble shaft including normally alining central and end sections, said end sections being mounted for angular adjustment, means for holding said sections against movement out of adjusted positions, and rotary plows carried by each section of the shaft.

3. A machine of the class described including a wheel supported frame, a revoluble shaft including an intermediate section, and end sections connected to said intermediate section by universal joints and normally alining therewith, means for adjusting said end sections angularly relative to the intermediate section, and rotary plows carried by each of the shaft sections.

4. A machine of the class described including a wheel supported structure, a shaft including an intermediate section and end sections connected to the intermediate section by universal joints, means for rotating the shaft, rotary plows carried by the sections of the shaft, and cleaning devices adjustably supported adjacent the shaft sections.

5. A machine of the class described including a wheel supported structure, a shaft consisting of sections adjustable relative to each other, means for rotating the shaft, rotary plows carried by the shaft sections, bars carried by said structure and including adjustable sections, said bars being extended parallel with the shaft sections, and cleaning fingers extending forwardly and downwardly from the bars and between the plows.

6. A machine of the class described including a wheel supported main frame, a supplemental frame thereunder, a pivot shaft journaled upon the main frame and constituting the pivotal connection between the two frames, means for shifting the supplemental frame toward or away from the main frame, a shaft section journaled within the supplemental frame, shaft sections connected to the first mentioned section by universal joints, and mounted for angular adjustment, means for holding said adjustable shaft sections against swinging movement, rotary plows carried by the plow sections, means for transmitting motion to said shaft sections from the pivot shaft, and means for rotating said pivot shaft.

7. A machine of the class described including a wheel supported main frame, a supplemental frame thereunder, means for elevating the supplemental frame relative to the main frame, a pivot shaft journaled on the main frame and constituting the pivotal connection between the two frames, said supplemental frame having oppositely disposed arcuate portions, a shaft journaled on the supplemental frame and including an intermediate section, and end sections connected to the intermediate section by universal joints, said end sections being mounted for angular adjustment, bearings adjustably mounted on the arcuate portions of the supplemental frame and supporting the outer ends of the adjustable shaft sections, rotary plows carried by the shaft sections, means for rotating the pivot shaft, and means for transmitting motion from the pivot shaft to the sectional shaft.

8. A machine of the class described including a wheel supported main frame, a supplemental frame thereunder and having oppositely disposed arcuate portions, a pivot shaft journaled on the main frame and constituting the pivotal connection between the two frames, means for raising the supplemental frame relative to the main frame, a sectional shaft journaled upon the supplemental frame and including an intermediate section and end sections connected to the intermediate section by universal joints, said end sections being mounted for angular adjustment, bearings adjustably mounted on the arcuate portions of the supplemental frame and supporting the outer ends of the adjustable sections of the shaft, rotary plows carried by the sections of said shaft, a bar supported adjacent and parallel with the intermediate section of the shaft, bars pivotally connected to the first mentioned bar and adjustably supported by the arcuate portions, said adjustable bars being normally parallel with the adjustable shaft sections, cleaning fingers curved forwardly and downwardly from the bars and extending between the plows, and means for rotating the plows.

In testimony that I claim the foregoing as my own, I have hereto affixed my signature in the presence of two witnesses.

McROY DE VIESE.

Witnesses:
P. E. HEISEL,
W. H. CASTLE.